United States Patent [19]

Fischer et al.

[11] Patent Number: 4,640,654

[45] Date of Patent: Feb. 3, 1987

[54] ANCHOR

[75] Inventors: Artur Fischer, Weinhalde 34, D-7244 Waldachtal 3/Tumlingen; Jürgen Onasch, Bonn; Manfred Haage, Herrenberg-Oberjesingen, all of Fed. Rep. of Germany

[73] Assignee: Artur Fischer, Waldachtal/Tumlingen, Fed. Rep. of Germany

[21] Appl. No.: 740,645

[22] Filed: Jun. 3, 1985

[30] Foreign Application Priority Data

Jun. 1, 1984 [DE] Fed. Rep. of Germany ....... 3420375

[51] Int. Cl.⁴ .............................................. F16B 13/04
[52] U.S. Cl. ......................................... 411/55; 411/57
[58] Field of Search ....................... 411/18, 44, 45, 46, 411/47, 48, 49, 50, 51, 54, 55, 56, 57, 60, 63, 64, 65, 66, 67, 68, 71, 72, 24, 25, 26, 27, 28; 405/259

[56] References Cited

U.S. PATENT DOCUMENTS

| 1,120,367 | 12/1914 | Booraem et al. | 411/26 |
| 1,603,292 | 10/1926 | Peirce | 411/49 |
| 1,850,768 | 3/1932 | Peirce | 411/55 |
| 3,460,429 | 8/1969 | LaTorre | 411/56 X |
| 3,524,379 | 8/1970 | Fischer | 411/65 |
| 3,855,896 | 12/1974 | Kaufman | 411/60 X |
| 4,094,223 | 6/1978 | Fischer | 441/44 |
| 4,557,649 | 12/1985 | Jeal | 411/55 X |
| 4,560,311 | 12/1985 | Herb et al. | 411/55 X |

FOREIGN PATENT DOCUMENTS

| 267827 | 1/1969 | Austria | 411/51 |
| 1109631 | 6/1961 | Fed. Rep. of Germany | 405/259 |
| 2150572 | 4/1973 | Fed. Rep. of Germany | 411/55 |
| 2247003 | 4/1974 | Fed. Rep. of Germany | 411/24 |
| 2711845 | 9/1978 | Fed. Rep. of Germany | 411/51 |
| 3027408 | 2/1982 | Fed. Rep. of Germany | . |
| 1400747 | 4/1965 | France | 411/55 |
| 58019 | 12/1924 | Sweden | 411/55 |
| 444623 | 3/1936 | United Kingdom | 411/55 |

Primary Examiner—Thomas J. Holko
Attorney, Agent, or Firm—Michael J. Striker

[57] ABSTRACT

An anchor for fastening in bore holes comprises an expander body driven into an expansion sleeve, having a slotted expansible portion, by a stay bolt to which a torque is applied to draw the expander body into the expansion sleeve. The expander body has at its trailing end a conical portion which merges into a concavely-curved portion. The angle of the concavity of the curved portion at the leading end of the expander body corresponds to a double angle of inclination of the conical portion to the central axis of the anchor.

7 Claims, 3 Drawing Figures

ANCHOR

BACKGROUND OF THE INVENTION

The present invention relates to an anchor for fastening in drill or bore holes formed in supporting structures, for example of concrete.

Anchors for anchoring in pre-drilled bore holes of the type under discussion have been known. One of such anchors is disclosed, for example in applicant's U.S. Pat. No. 3,837,257. The anchor of the foregoing type includes an expansion sleeve having an expanding slotted portion and driven onto an expander body by means of an elongated threaded stay bolt screwed into the expander body and accessible from the outside of the bore hole. A torque applied to the head of the stay bolt draws the expansion sleeve onto the conical surface of the expander body. An intermediate sleeve of plastics is arranged between the outer support of an object being secured to the supporting structure, for example of concrete, and the expansion sleeve. This plastic sleeve forms a bearing zone.

Conventional anchors are fastened in the supporting structure in such a manner that the expander cone is drawn into the expansion sleeve whereby the expansion sleeve is supported against the abutment or support of the stay bolt either immediately or via a spacer sleeve. The expander body can be connected to the bolt by means of a thread as mentioned above or it can be pressed against the bolt which has a nut as an abutment or outer support.

The insertion of such an anchor into the pulling zone of the anchor base requires high after-expansion capabilities in order to avoid decrease of holding forces due to widening of the bore hole caused by the formation of cracks. A satisfactory after-expansion can be obtained by a flat cone of the expander body. However, with such flat cone the rigidity of the anchor base is not completely used because the expander body is prematurely drawn through the expansion sleeve. This effect occurs even sooner when the bore hole is widened by a crack, as compared to the initial diameter of the bore hole.

With a very steep angle of the conical surface of the expander body there is a danger that the anchor can expand non-sufficiently because high torque required for driving of the expander cone into the expansion sleeve can not exceed a permissible load on the stay bolt. The failure of such anchoring normally results in that the entire anchor falls out from the bore hole.

SUMMARY OF THE INVENTION

It is an object of the present invention to provide an improved anchor for fastening in support structures.

It is another object of the invention to provide an anchor which would ensure high after-expansion abilities, on the one hand, and high pulling forces preventing a crack formation, on the other hand.

These and other objects of the invention are attained by an anchor for fastening in bore holes formed in support structures, comprising an expansion sleeve having a leading end; an expander body having a conical portion and positioned at said leading end; a stay bolt having an abutment with gripping surfaces for applying a torque thereto, said bolt being inserted into said sleeve and engaged with expander body for driving said expander body into said sleeve; and an intermediate sleeve positioned between said abutment and said expansion sleeve, said expander body including a concavely curved portion, said conical portion tangentially merging at a greatest diameter thereof into said curved portion, said curved portion forming at a leading end of said expander body a tangent line which extends at an angle to a central axis of the anchor, said angle approximately corresponding to a double angle of inclination of said conical portion to said central axis.

After the insertion of the anchor according to the invention into a pre-drilled bore hole the expander body, upon the rotation of the stay bolt, is moved in the axial direction and is drawn into the expansion sleeve. First, a conical portion having a flat angle comes into engagement with the inner surface of the expansion sleeve, and a high radial pressure is produced by a small pulling torque; this pressure will prevent rotation of the anchor in the bore hole. In a narrow bore hole a maximal pulling torque is obtained at the position in which the expanding slotted portion of the expansion sleeve is located yet on the conical portion of the expander cone. With greater bore holes the expander cone, if the same torque is applied thereto, is driven further into the expansion sleeve unless the increase of the expansion angle, produced by the concave outer surface of the expander body causes a more intensive expansion. With a higher loading, the expander body is driven even further into the expansion sleeve whereby, due to a continually increasing expansion angle, the expansion is significantly increased.

It is obtained by means of the concavely-curved portion, extending immediately from the conical portion of the expander cone, that a corresponding geometry of the bore hole defines optimal anchoring conditions. Thus no cracks are produced in the walls of the bore hole because an after-slipping of the expander body in the expansion sleeve, which causes a crack formation, is prevented.

The angle of inclination of said conical portion may be about 6°. The angle of inclination at the leading end of the concave portion may be thus about 12°.

The expansion sleeve may have at its leading end a circular saw tooth-shaped groove which tapers towards a trailing end of the expansion sleeve. A free surface at the leading end of the expansion sleeve is thereby formed so that even at a small radial pressure a deep engagement of the leading end of the expansion sleeve into the walls of the bore hole is obtained. Therefore an additional form-locking connection occurs because the leading end of the expansion sleeve produces with an increasing load an undercut.

This effect is increased if in a modified embodiment the expansion sleeve has in an outer surface thereof, in the region of said leading end, a circular groove, and the anchor further includes a spring ring positioned in said circular groove and extending radially beyond an outer surface of the expansion sleeve. A hardened ring, opened at this location, very deeply digs into the wall of the bore hole due to the fact that the ring is very rigid. At the same time the spring ring rigidly clamps the expanding slotted portion of the expansion sleeve on the expander body so that a blocking of the expansion sleeve during the insertion of the anchor would be avoided, and on the other hand, the rotation of the expander body by clamping with the expansion sleeve would be prevented.

The spring ring may taper towards the trailing end of the expansion sleeve. This provides for a specifically favorable outer surface of the spring ring for the engagement in the walls of the bore hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
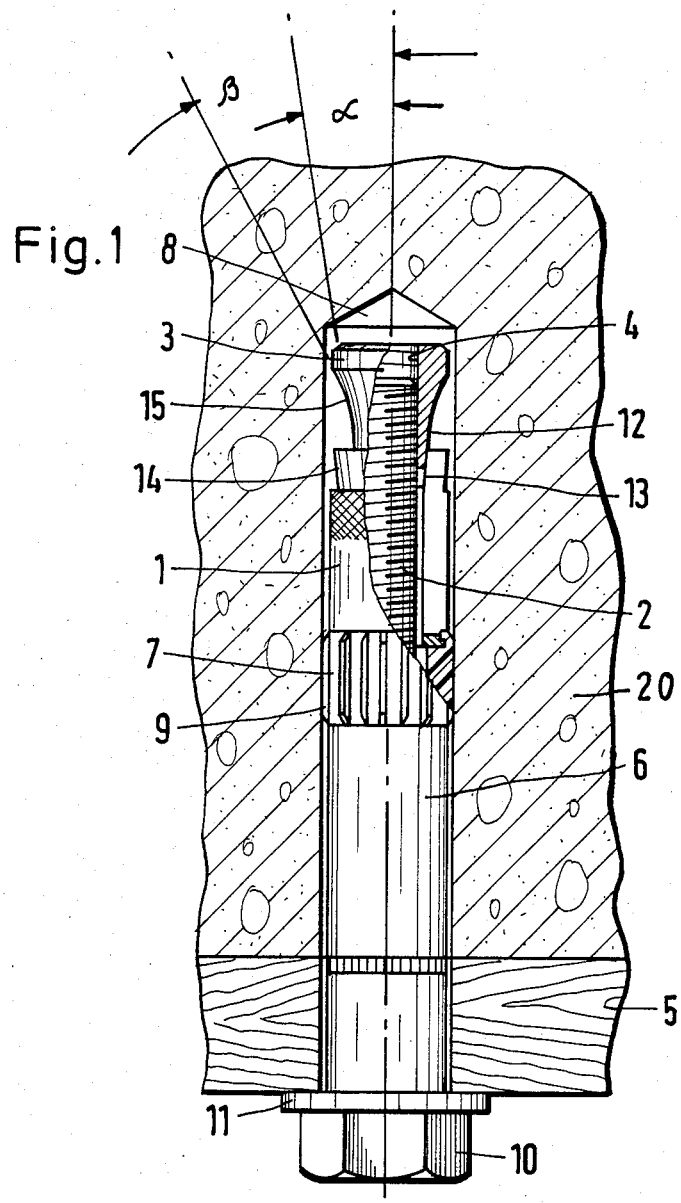
FIG. 1 is an axial section through the anchor according to the invention, inserted into a concrete support structure.
Figure 2:
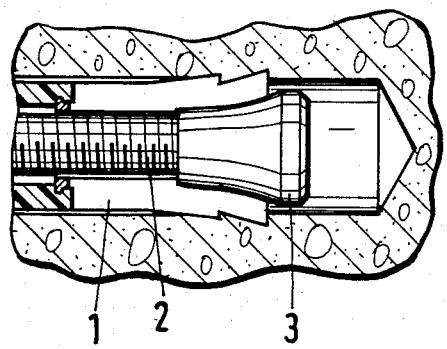
FIG. 2 is a sectional view through the anchor in its anchored condition.

Referring now to the drawings in detail, the anchor shown in FIG. 1 is comprised of an expansion sleeve 1 which is slotted at the outer periphery thereof starting from the leading end over a portion of its length, and an expander body 3 onto which the expansion sleeve 1 is driven via a bolt 2 for the expansion of the anchor in a bore hole 8. To connect the expander body 3 with the bolt 2 the expander body has an inner thread 4 engaging with the outer thread of bolt 2.

An object 5 being secured to the concrete support structure 20 is positioned between a spacer sleeve 6 and a washer 11. To bridge the bore during the securing of the object 5 to the support structure a sleeve of plastics 7, acting as a bearing zone, is arranged between the expansion sleeve 1 and the spacer sleeve 6. Additional sleeve 7 made of plastics which, due to the provision thereon of elongated ribs or projections 9 adapted to be clamped in the bore hole 8, serves at the same time as a means for preventing joint rotation of the expansion sleeve 1. A head 10 of the bolt serves the purpose of a counter support or abutment for clamping the object 5 being fastened to the support structure 20 and for the driving of the expander body 3. Bolt head 10 is supported against the outer face of object 5 by means of the washer 11.

Upon imparting a torque to the bolt head 10 the conical expander portion 12 of the expander body 3 is first driven in by an amount of expansion angle of about 12° into the abutting inclined surface 13 provided in the expansion sleeve 1, the angle of inclination of which corresponds to the expansion angle of the conical expander portion 12. The expanding portions of the sleeve 1, formed by the elongated slots circumferentially spaced from each other in the known fashion, are radially pressed into the walls of the bore hole 8. The outer surface of expansion sleeve 1 is provided with a circular saw tooth-shaped groove 14 which tapers towards the trailing end of the sleeve. Due to this groove a free surface is provided, which, with relatively small expansion pressure forces, permits for a deep digging of the expansion portions of the sleeve 1 into the wall of the bore hole. The expander body 3 is formed with a concavely curved portion 15. Due to this concavity a continuous increase of the expansion angle up to the angle at the leading end of the portion 15 is obtained. The angle at the leading end of the expander cone corresponds somewhat to a double angle value of the conical expander portion 12. Thereby with a deccelerated insertion path of the expander body 3 into the expansion sleeve 1 a more intensive expansion is obtained.

Figure 3:
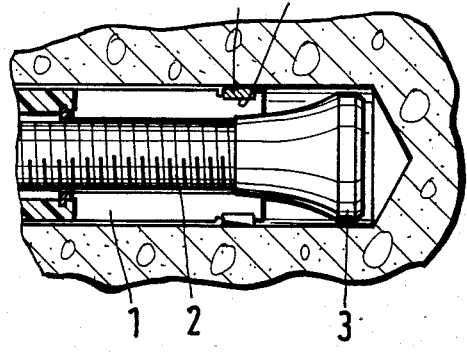
FIG. 3 is a sectional view through the anchor with an expansion sleeve having a spring ring positioned in a circular groove.

In order to further improve engaging of the expansion portion of sleeve 1 with the walls of the bore hole, particularly in case of very hard materials of the support structure, in the modified embodiment shown in FIG. 3, a circular groove 16 is formed in the outer surface of the expansion sleeve 1 in the region of its leading end. This groove receives a hardened steel spring ring 17. The outer face of the spring ring 17 tapers towards the trailing end of the ring and thus the sleeve 1 so that a sufficient outer surface for the engagement in the walls of the bore hole is ensured. The tip of spring ring 17 extends radially beyond the outer diameter of the adjacent portion of the expansion sleeve 1, acting as a cutting edge.

It will be understood that each of the elements described above, or two or more together, may also find a useful application in other types of anchors for anchoring in bore holes differing from the types described above.

While the invention has been illustrated and described as embodied in a an anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchor for fastening in bore holes formed in support structures, comprising an expansion sleeve having a leading end; an expander body positioned at said leading end of said expansion sleeve and including a conical portion; a stay bolt having an abutment with gripping surfaces for applying a torque thereto, said bolt being inserted into said sleeve and engaged with said expander body for driving said expander body into said sleeve; and an intermediate sleeve positioned between said abutment and said expansion sleeve, said expander body further including a concavely-curved portion, said conical portion immediately tangentially merging at a greater diameter thereof into said concavely-curved portion, said concavely-curved portion forming at a leading end of said expander body a tangent line which extends at an angle to a central axis of the anchor, said angle approximately corresponding to a double angle of inclination of said conical portion to said central axis.

2. The anchor as defined in claim 1, wherein the angle of inclination of said conical portion is about 6°.

3. The anchor as defined in claim 1, wherein said expansion sleeve has at said leading end a circular saw tooth-shaped groove which tapers towards a trailing end of the expansion sleeve.

4. The anchor as defined in claim 1, wherein said expansion sleeve has in an outer surface thereof, in the region of said leading end a circular groove; and further including a spring ring positioned in said circular groove and extending radially beyond an outer surface of the expansion sleeve.

5. The anchor as defined in claim 4, wherein said spring ring tapers towards a trailing end of the expansion sleeve.

6. The anchor as defined in claim 1, wherein said intermediate sleeve is made of plastics and forms a bearing zone between said abutment and said expansion sleeve.

7. The anchor as defined in claim 1, said further including a spacer sleeve positioned on said stay bolt between said abutment and said intermediate sleeve.

* * * * *